United States Patent

[11] 3,581,089

| | | | | | | |
|---|---|---|---|---|---|---|
| [72] | Inventor | Leonard J. Craig<br>Carpinteria, Calif. | | 3,471,697 | 10/1969 | Riddle .......................... 250/83.3 |
| [21] | Appl. No. | 836,395 | | 3,500,048 | 3/1970 | Menke .......................... 250/83.3 |
| [22] | Filed | June 25, 1969 | | 3,508,051 | 4/1970 | Nichols et al. ................. 250/83.3X |
| [45] | Patented | May 25, 1971 | | | | |
| [73] | Assignee | The United States of America as represented by the Secretary of Air Force | | | | |

Primary Examiner—James W. Lawrence
Assistant Examiner—Davis L. Willis
Attorneys—Harry A. Herbert, Jr. and Henry S. Miller, Jr.

[54] CATADIOPTRIC REFLEX RADIATION DETECTION CONVERSION, LOCATION AND DISPLAY DEVICE
4 Claims, 2 Drawing Figs.

[52] U.S. Cl. .................................................. 250/83R,
250/83.3H, 356/4
[51] Int. Cl. .................................................. G01t 1/00
[50] Field of Search .......................................... 250/71.5,
83.3 IR, 83.3 IRI; 356/4

[56] References Cited
UNITED STATES PATENTS
3,454,773  7/1969  Bulthuis et al. ................. 250/83.3X ABSTRACT: A system for detecting and locating short duration radiant energy pulses occurring in the nonvisible portions of the spectrum by converting each event of pulsed energy within a region of an observer's field of view to a visible pair of distinctive orthogonal lines intersecting over the source of radiation including a pair of apertures, toric reflectors with mutually orthogonal principal axes reflecting the incident radiation on a pair of linear arrays of photosensitive detectors, and detector circuits for illuminating corresponding optoelectric members and an optical system for projecting the visible light before an observer's eyes.

CATADIOPTRIC REFLEX RADIATION DETECTION CONVERSION, LOCATION AND DISPLAY DEVICE

BACKGROUND OF THE INVENTION

This invention relates generally to detection of nonvisible radiation and more specifically to a reflex radiation detector and display device.

Various ways have been suggested for detecting invisible radiation, particularly in the infrared spectrum. Generally, these methods and the associated devices provide an observer with a field of observation illuminated with invisible radiation and with a means to view the overall field. The operation generally requires bulky equipment, such as power supplies, lights and etc. and will only provide a limited field of view. One prior art device has been suggested for use with a rifle which may be used for nighttime hunting or for military purposes. This device, which is typical of the prior art, merely illuminates an area with infrared radiation and provides a viewing means in order that a target may be seen.

Conversely the instant invention provides no source of infrared radiation, permits a view of an entire field of observation and yet immediately identifies a source of radiation. This eliminates the problem of trying to flood an entire area with infrared radiation in order to see a target and, further, allows the detection of a target or and, further, allows the detection of a target or an object merely from heat being generated and giving off infrared rays. Additionally, the instant invention may be readily adapted to fit into a pair of goggles thus allowing the observer to have both hands free while scanning his field of view.

The prior art devices act similar to a telescope in that they reduce the field of observation greatly thus making it difficult for an observer once he has located an object or target to place it relative to his field of observation. The instant invention projects an indication of the radiation source into the field of view and allows the observer to scan his entire field of observation and pinpoint the source of radiation and identify it immediately. The prior art further provides no means for locating sources of short duration radiant energy. If telescope devices are used, the pulse would be gone by the time the observer removed the telescope from his eye to locate the spot within his field of view.

SUMMARY OF THE INVENTION

The invention employs a pair of linear arrays of photosensitive detectors, each array having suitable optics, including toric reflectors with mutually orthogonal principal axes, such that each short duration pulsed radiant event energizes a detector pair—one in each array—directly corresponding to the relative azimuth and elevation of the event. The output from the photosensitive detectors is fed into a signal conditioning circuit where each detector has its own channel wherein each channel provides appropriate energization of an incandescent lamp or other electric device corresponding to the radiant energy input to each detector. The light generated as a result of the circuitry corresponds to the location of the source and through suitable optical components focuses the light on a screen-reticle as a pair of orthogonal lines, each of a different color whose intersection because of the principle of color addition is in another color such as white. A partially reflecting surface causes the intersection to be reflected back into the observer's eye. This device may be incorporated into a pair of goggles similar to spectacles worn by an observer or into a pair of binoculars as shown in the drawings presented or, alternatively, this invention may be incorporated into a gunsight. The actual use of the invention is not limited by the housing in which it is contained nor to any specific range of radiation, for example it is possible to use appropriate detectors and locate sources of gamma radiation.

It is, therefore, an object of this invention to provide a new and improved means for detecting nonvisible radiation.

It is another object of this invention to provide a new and improved means for detecting and displaying nonvisible radiation.

It is a further object of this invention to provide a radiation detector and display device which does not limit the field of view of an observer.

It is still another object of this invention to provide a reflex radiation detector.

It is still a further object of this invention to provide a means for detecting infrared radiation and converting it to visible radiation.

It is still another object of this invention to provide a means for detecting, locating and displaying sources of short duration nonvisible radiation.

Still another object of this invention is to provide a lightweight radiation detector which provides a full field view for an observer using it.

It is still another object of the invention to provide a radiation detector which is economical to produce and utilizes conventional, currently available components that lend themselves to standard mass production manufacturing techniques.

DESCRIPTION OF THE INVENTION

Figure 1:
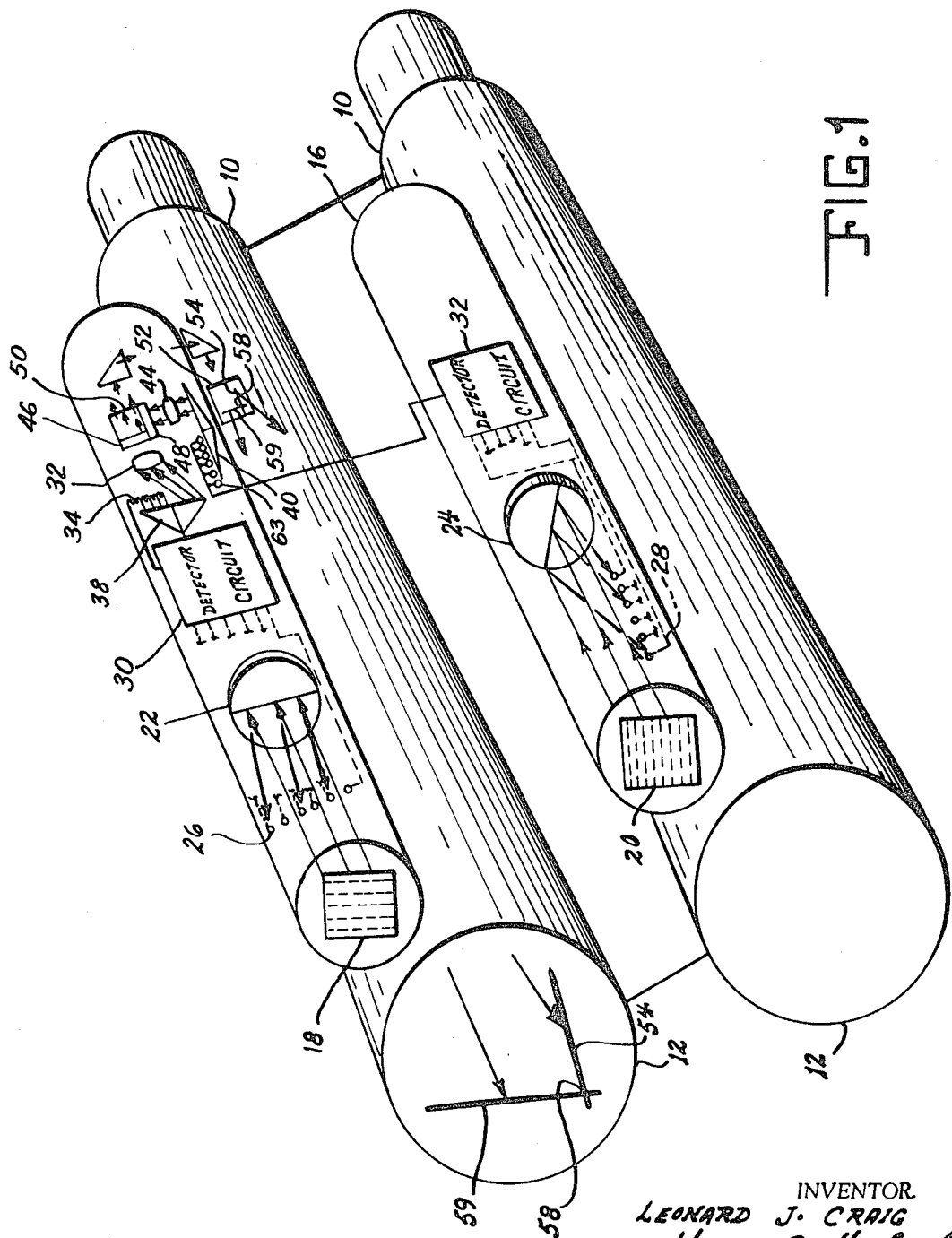
FIG. 1 is a schematic view of the invention incorporated in a pair of fieldglasses.

Referring now to FIG. 1, the invention is shown incorporated in a pair of fieldglasses is shown generally at 10. Located above each of the magnifying members 12 is a tube 14 and 16. Any radiant energy occurring within the invention's field angle, which is determined by both the detector units field angle and the projection field angle, will be within the greater field of view of the observer, determined by the objective diameter, magnification of display, and eye piece relief and provide the input signal energy to the device. A portion of that energy passes through each detector unit's aperture and filter 18, 20 and the nonblocked energy in a specific band of the optical spectrum is subsequently reflected by each unit's toric mirror 22 and 24. The energy reflected within each detector unit impinges on a particular detector of a linear array of detectors 26 and 28 located in the reflectors'focal plane which is coincident with the filter. The detectors of an array are spaced so that the energy focused on a particular detector is a measure of the angle between the radiant energy source and the plane containing the (longitudinal) optical axis of a detector unit and the principal axis of the toric reflector. Consequently, the arrangement of two detector units with parallel (longitudinal) optical axes and mutually orthogonal reflector (principal) axes provides for the simultaneous measure of the azimuth and elevation of an event with respect to the optical axis of the system.

Each detector has a channel of signal conditioning circuitry 30, 32 to amplify, stretch, and shape its electrical signals generated by the short duration radiation pulses; when the input radiation intensity exceeds some predetermined threshold, the signal channel provides an output to energize an incandescent lamp 34, 36 or other optoelectric device. Consequently, each lamp of a particular (azimuth or elevation) light bank directly corresponds to a specific detector in a (azimuth or elevation) linear detector array.

A single radiation event which results in the energization of a lamp pair in object space further generates a pair of light beams focused to lines in image space by the use of Porro prisms 38, 40 and cylindrical lenses 42, 44. The light beams so produced pass through color filters 46, 48, a beam splitter 50, and a right-angle prism prior to impinging on a single image plane. The generated pair of lines are mutually orthogonal—each line is parallel to the principal axis of the toric reflector in its respective detector unit, each line has a distinct color because of the color filters, and both are imaged on a rear projection screen 52 which is also a reticle surface. The filters may, for example, produce a magenta azimuth line 54 and a green elevation line 56 resulting in a white point at their intersection 58.

Figure 2:
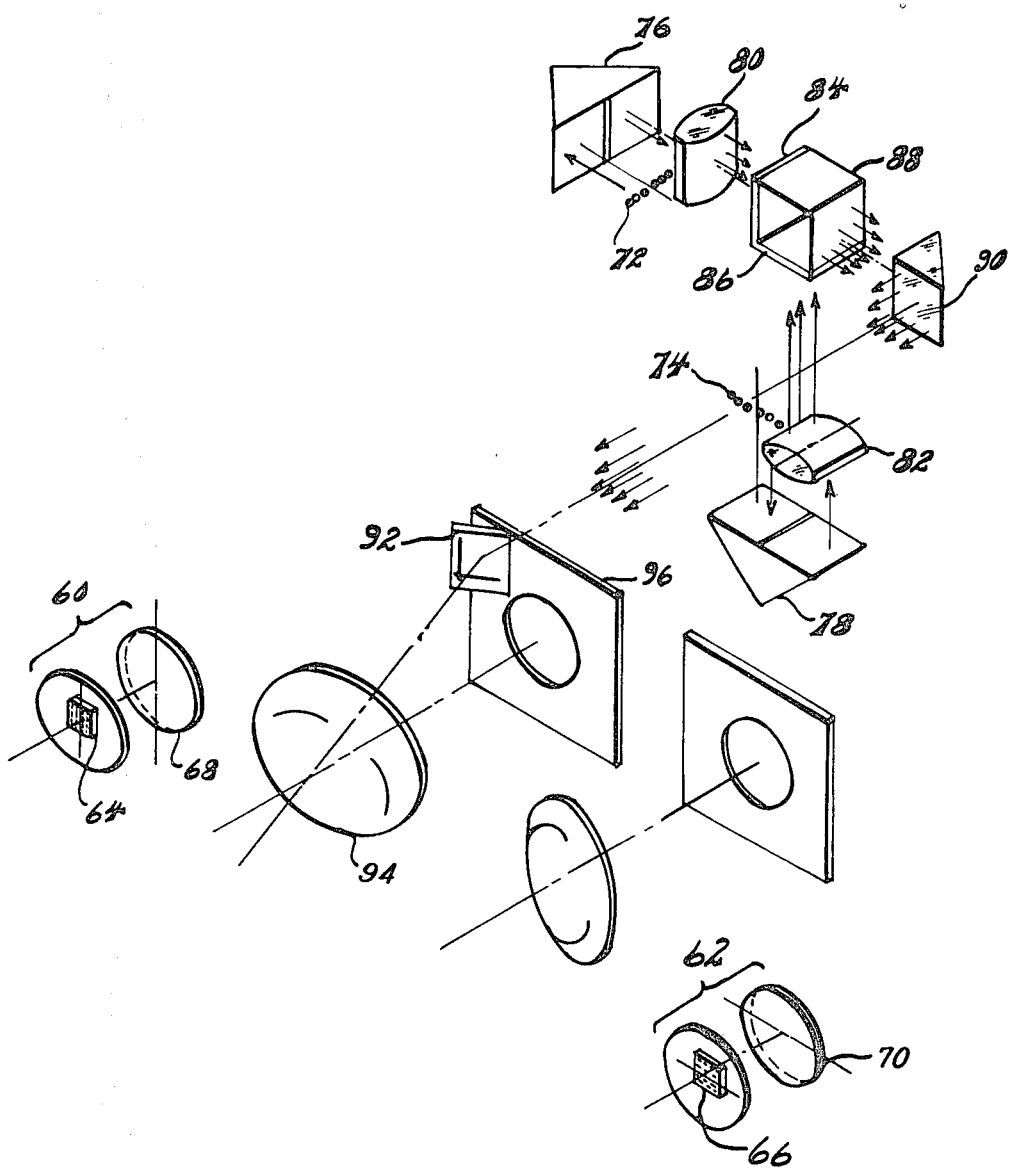
FIG. 2 is an exploded view of the optical system utilized in this invention.

Concerning FIG. 2, there is shown detector units 60 and 62 with each detector unit consisting of a filter aperture 64 and 66 and a toric mirror 68 and 70. Radiation entering the detector unit is reflected on to photosensitive detectors which then pass a small current on to a detector circuit as explained with regard to FIG. 1. Detector circuit then provides current to illuminate selected portions of the light banks 72 for azimuth and 74 for elevation. Generated light is sent through a Porro prism 76 and 78 and thence to cylindrical lenses 80 and 82. The light bank passes through colored filters 84 and 86 and is combined in the beam splitter 88. The output of the beam splitter passes through the right-angle prism 90 and on to the round glass screen-reticle 92. A concave partially reflected surface 94 which is in this case the magnifying lens of the binoculars then reflects the reticle into the viewing aperture 96 where it is seen by the observer.

The reticle-screen 92 is in the focal plane of the second (concave) surface of the objective lens, and said reticle-screen is located so it doesn't obscure the field of view of an observer looking through the eyepiece 96. Consequently, an observer viewing a scene through the eyepiece wherein a nonvisible pulsed radiant event occurs sees the pair of orthogonal colored lines, generated as described hereinbefore, projected at infinity, magnified, (in a ratio corresponding to an observer's near accommodation to the focal length of the objective's reflective rear surface, approximately 10:1), and intersecting at a point in the field of view at the location of the energizing radiation pulse.

Thus the invention described places a pair of visible colored crosshairs on a nonvisible source of radiation.

I claim:

1. A system for detecting, locating and displaying short duration radiant energy pulses comprising: a pair of individual radiation detecting means including, a first and second housing, an aperture located at one end of each housing, a radiation filter mounted in each aperture, a toric reflector mounted in the first housing having its axis in a particular direction, a toric reflector mounted in the second housing having its axis normal to the direction of said first toric mirror and a linear array of radiation sensitive elements mounted at the focal point of each toric reflector; means connected to each radiation detecting means for selectively converting detected radiant energy into visible radiation; means for combining the output of the energy conversion means into orthogonally related beams; and means for receiving the visible radiation and displaying the orthogonal relationship of the light beams.

2. A system according to claim 1 wherein the means for converting the detected energy into visible radiation include: a detector circuit means and a light band connected to the detector circuit means.

3. A system according to claim 1 wherein the means for combining the visible radiation includes: a pair of orthogonally mounted Porro prisms; a beam splitting means; a lens means mounted between each prism means and the beam splitter and prism means for changing the direction of the output of the beam splitter.

4. A system according to claim 1 wherein the light receiving means includes a projection screen and reticle.